(No Model.)
R. M. HUNTER.
ELECTRIC RAILWAY.
No. 429,687. Patented June 10, 1890.
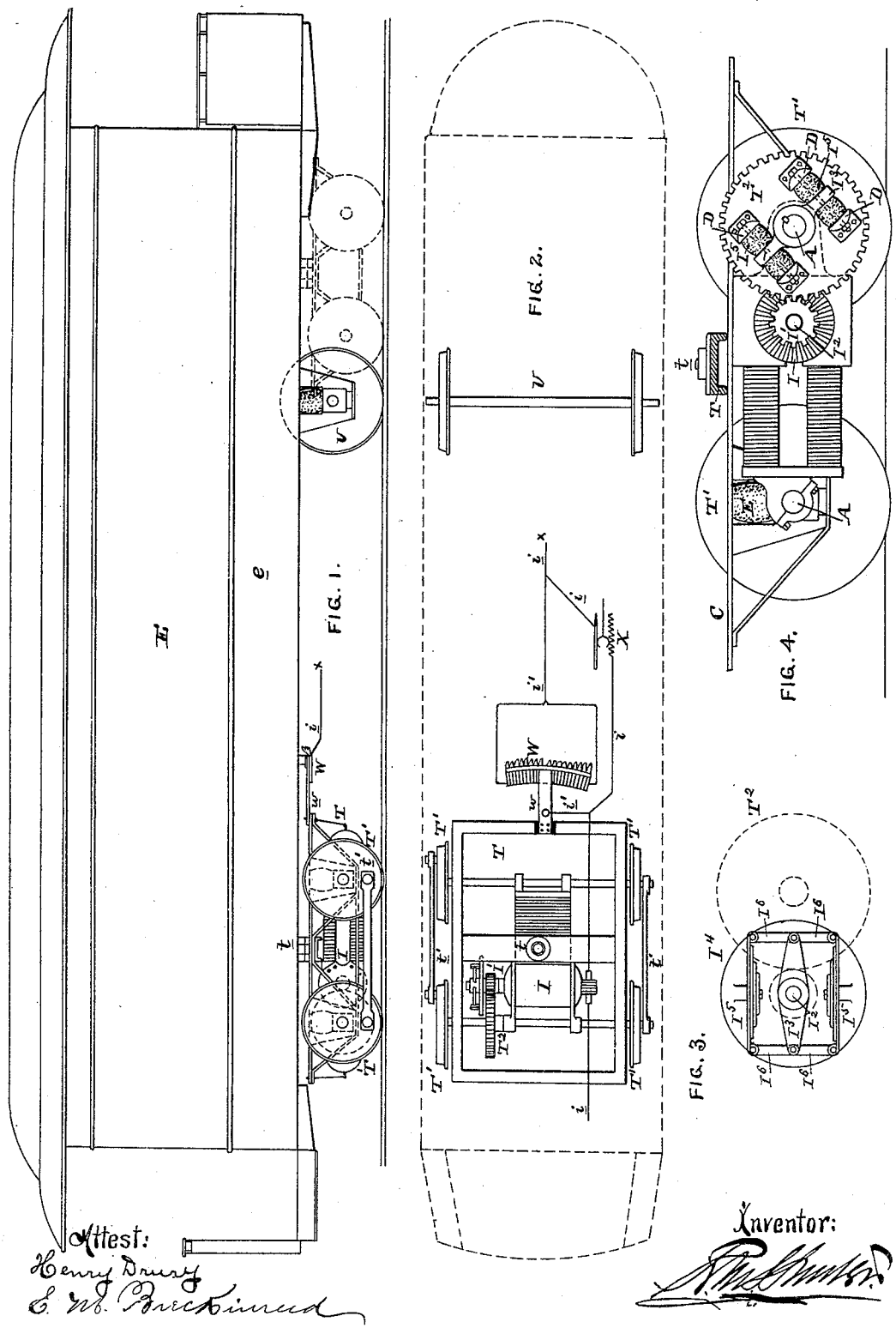
Attest:
Henry Drury
E. M. Buckminster
Inventor:
R. M. Hunter

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 429,687, dated June 10, 1890.

Original application filed March 24, 1887. Serial No. 232,352. Divided and this application filed December 1, 1887. Serial No. 256,604. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification and shown in the accompanying drawings, which form part thereof.

This is a division of my application filed March 24, 1887, and serially numbered 232,352.

My invention consists in a peculiar construction of running-gear, similar in a measure to what is disclosed in my applications Serial Nos. 216,643, 220,240, and 228,533; also, in the elastic connection between the motor-shaft and axle, whereby the motor may be easily started and stopped.

In connection with the pivoted truck of the electrically-propelled vehicle I may employ a resistance-controlling device in the motor-circuit, which operates automatically to cut out or in a resistance commensurate with the movement of the truck, and therefore with the curve of the track, the object being to increase automatically the power of the motor in passing around a curve.

In my construction I support the car upon one or more pivoted trucks, and am therefore allowed to turn sharp curves quickly and easily, owing to the small wheel-base. Each of such trucks is provided with an electric motor to make it self-propelling, whereby instead of the truck being pulled along it pulls the car-body. The motor is supported upon the axles or any suitable frame-work, and its shaft is connected to the axle by elastic gearing. This elasticity in the power-transmitting device I have found in practice enables me to start easily and employ a small motor where with a rigid connection a large motor was required. This is due to the fact that the armature is allowed to obtain some motion before the axle begins to turn.

My invention also comprehends a minor feature fully set out hereinafter.

In the drawings, Figure 1 is a side elevation of a car embodying my improvements. Fig. 2 is a plan view of the trucks thereof and motor-circuits. Fig. 3 is an elevation showing the preferred elastic connection between the motor-shaft and its pinion, and Fig. 4 is a sectional elevation of a car-truck with electric motor embodying my invention.

Referring now specifically to the drawings, we have the car-body $e$ of the ear E supported, if desired, at one end by the fixed axle and wheels U, such as found on any ordinary car or upon a pivoted truck, as indicated in dotted lines, while the other end of the car-body is supported on a pivoted truck T—such, for instance as set out in my applications Serial Nos. 216,643 or 220,240; or the truck may be such as set out in my application Serial No. 217,346. This truck has its wheels T, on each axle A connected by links $t'$, arranged on the outsides of the wheels on crank-pins, and which cranks on opposite sides of the trucks are set at an angle of forty-five degrees with each other, as on any locomotive. This is to increase the traction. The car-body is supported on truck-frame C, which rests upon the axle-boxes, by springs E. The motor I is supported upon the axles A or part of the truck-frame and independent of the car-body.

In Figs. 1, 2, and 3 the motor-shaft $I^2$ is connected with one of the axles by a pinion $I'$ and spur-wheel $T^2$, the latter being secured to the axle.

To enable the motor to start up easily, the pinion $I'$ is secured to its shaft by a suitable elastic connection. I employ a spring, and may make it as shown in Fig. 3. In this figure, $I^3$ is a cross-bar secured to the motor-shaft $I^2$, and $I^4$ is a disk secured to the pinion $I'$, Fig. 2. Secured to this disk are the springs $I^5$, somewhat similar to carriage-springs, and the free ends of these springs are connected by links $I^6$ with the cross-arms $I^3$. By this means the motor may start to rotate before overcoming the inertia of the car and thereby increase the effective power of the motor on starting and reduce the wear and tear. It is evident that coil or other springs may be substituted in place of the flat springs, as indicated in Fig. 4, in which we have the elastic connection on the axle in place of the motor-shaft.

Referring to Fig. 4, I show the elastic gearing somewhat modified from that illustrated in Fig. 3, but substantially equivalent in all respects. Here the axle A has the cross-arm I³ keyed to it, and the springs I⁵, arranged upon either side, are held between said arm and cups D on the gear-wheel T², and may be secured in place by bolts d. The gear is loose on the shaft A and the motor-pinion I' is fast to the motor-shaft I². In this construction the motor-shaft may make a large portion of a revolution before the axle begins to rotate, and thus may have its power augmented prior to being fully exerted. I do not limit myself to any specific details of this elastic connection. In practice I have found rubber springs to work admirably.

Secured to the truck to one side of its pivot t is a contact-finger w, which sweeps over a variable resistance W, so arranged that upon the truck swinging in either direction, as in turning a curve, a portion of the resistance will be automatically cut out of the motor-circuit to increase the power of the motor commensurately with the resistance offered in going around the curve. The sharper the curve the greater the power of the motor, and vice versa. This variable resistance W is preferably located in a shunt-circuit i' with respect to the motor-circuit i, which, within that portion inclosed by the shunt i', may have a resistance-changer X, which is under the control of the operator. By this means the automatic resistance-changer will not affect any change desired by the operator, as the entire resistance X may be removed, which would, in effect, cut out resistance W, as the current would readily flow over i. If the resistance W were in the main motor-circuit on a straight track, the full resistance W would be in circuit and could not be cut out without considerably modifying the construction.

By the construction herein set out it is evident that the truck-frame and car-body which it supports may rest upon springs and have vertical movement, while the motor may be rigidly connected to the axles—that is, without vertical movement—and yet have all of the advantage of the flexible connection, which I find of great importance in practice.

Locating the electrically-propelled truck near the rear end of the car gives us the advantage of increased traction, as the greatest weight of the passengers in a crowded car always comes on the rear part.

In my application, Serial No. 217,945, filed November 4, 1886, is claimed, broadly, the speed-reducing gearing in an electrically-propelled vehicle forming an elastic connection between the motor-shaft and axle, whereby the motor-shaft may be slightly rotated before starting the rotation of the axle, and also in said application is claimed specifically the location of an elastic connection between the axle and large spur-wheel. In this present application the claims are made to the specific construction, wherein the elastic connection is made between the motor-shaft and its pinion, and also to certain general construction, without specific limitation with respect to the elastic connection, except that it shall be between the motor-shaft and axle.

While I prefer the construction shown, I do not limit myself to the details thereof, as they may be modified in various ways without departing from my invention.

Having now described my invention, what I claim as new, and desire to secure by Letters Patent, is—

1. In an electric railway, a car-body for passengers, supported upon a fixed truck at one end and a pivoted truck at the other end, over which it extends, in combination with an electric motor supported on the pivoted truck under the car-body and mechanically connected with the axle of the truck.

2. In an electric railway, a car-body supported upon a fixed truck at one end and a pivoted truck at the other end, in combination with an electric motor supported on the pivoted truck and mechanically connected with its axle, a motor-circuit, and a resistance-changer in said motor-circuit having a part movable with the car-body and a part movable with the truck and operated by the movements of the pivoted truck to reduce the resistance in the motor-circuit when passing around a curve.

3. In an electric railway, a car-body supported upon a fixed truck at one end and a pivoted truck at the other end, in combination with an electric motor supported on the pivoted truck and mechanically connected with its axle, a motor-circuit, a resistance-changer in said motor-circuit having a part movable with the car-body and a part movable with the truck, and a resistance-changer in a shunt-circuit about that part of said motor-circuit containing its resistance-changer and operated by the movements of the pivoted truck to reduce the resistance in the motor-circuit when passing around a curve.

4. The combination of an electric-railway car, a pivoted truck therefor, an electric motor on said truck mechanically connected with the axle, whereby said axle may be rotated, a motor-circuit for supplying electricity to the motor carried by the car, and an automatic resistance-changer consisting of a part movable with the car-body and a part movable with the truck, whereby the relative movement of the car-body and truck in passing around a curve causes said resistance-changer to operate to control the supply of current to the motor.

5. The combination of an electric-railway car, a pivoted truck therefor, an electric motor on said truck mechanically connected with the axle, whereby said axle may be rotated, a motor-circuit for supplying electricity to the motor carried by the car, an automatic resistance-changer consisting of a part movable with the car-body and a part movable with the truck, whereby the relative movement of the car-body and truck in passing around a curve causes said resistance to operate to increase the supply of current to the motor, and independent means under the control of the operator to modify the automatically-adjustable resistance, whereby the effects of said automatic resistance-changer may be increased or decreased.

6. In an electric railway, a car-body supported upon a fixed truck at one end and a pivoted truck at the other end, in combination with an electric motor sleeved or journaled upon the axle of the pivoted truck and having its shaft mechanically connected with its axle, and connecting-bars to connect the wheels on each side of the truck to increase the tractive power of the truck.

7. The combination of a truck having a center pivot, an electric motor carried thereby and arranged below the pivot and mechanically connected with one of the axles, and two connecting-bars connecting the wheels on each side in pairs, so that all four wheels may be driven from one axle.

8. The combination of a truck having a center pivot, an electric motor carried thereby and mechanically connected with one of the axles, and two connecting-bars connecting the wheels on each side in pairs, so that all four wheels may be driven from one axle, the mechanical connection between the motor and axle being elastic, whereby the motor-shaft may rotate slightly before rotating the axle.

9. The combination of a truck having a center pivot, an electric motor carried thereby and mechanically connected with one of the axles, and two connecting-bars connecting the wheels on each side in pairs, so that all four wheels may be driven from one axle, the mechanical connection between the motor and axle consisting of a spur-wheel on the axle, a pinion on the motor-shaft, and an elastic connection between the pinion and motor-shaft, so that the motor-shaft may rotate slightly before rotating the axle.

10. The combination of the axle, a spur-wheel rigidly secured to same, an electric motor, a pinion rotating with the motor-shaft, and springs $I^5$, connecting the pinion and motor-shaft.

11. A four-wheeled truck, in combination with an electric motor supported on the axle and an elastic mechanical connection between the motor-shaft and axle.

12. The combination of a car-body, an electrically-propelled truck pivoted thereto, an electric motor supported on the truck, and an elastic or flexible mechanical power-connection between the axle of the truck and motor-shaft.

13. The combination of a car-body, an electrically-propelled truck pivoted thereto, an electric motor supported on one axle of the truck, and an elastic or flexible mechanical power-connection between the other axle of the truck and motor-shaft.

14. The combination of a car-body, an electrically-propelled truck pivoted thereto and provided with springs for the support of the car-body, an electric motor supported on the truck, and an elastic or flexible mechanical power-connection between the axle of the truck and motor-shaft.

15. The combination of a car-body, a pivoted truck supporting said car-body, an electric motor carried by said truck and arranged thereon below the pivot of the truck, and a power-transmitting connection between the motor-shaft and axle.

16. The combination of a car-body, a pivoted truck supporting said car-body, an electric motor carried by said truck and arranged thereon below the pivot of the truck, and an elastic or flexible power-transmitting connection between the motor-shaft and axle, whereby the motor-shaft may be put into motion before the axle begins to revolve.

17. In an electrically-propelled vehicle, the combination of a short truck having a pivot-point, a car-body having a platform extending over said truck and pivoted thereto, an electric-motor device to propel said truck, consisting of field-magnets carried by the truck and independent of the car-body platform, a rotating armature supported within said field-magnets, power-transmitting connections between the armature shaft and the axle of the truck, electric circuits for supplying current to the motor, and a current-regulating device to control the current flowing in the motor-circuit.

18. In an electrically-propelled vehicle, the combination of a short truck having a pivot-point, a car-body having a platform extending over said truck and pivoted thereto, an electric-motor device to propel said truck, consisting of field-magnets carried by the truck, located between the axles, and independent of the car-body platform, a rotating armature supported within said field-magnets, power-transmitting connections between the armature-shaft and one of the axles of the truck, power-transmitting connections independent of the motor between the two axles of the truck, whereby both axles are caused to rotate, electric circuits for supplying current to the motor, and a current-regulating device to control the current flowing in the motor-circuit.

19. The combination of a four-wheeled vehicle, the motor supported directly upon the two axles, but mechanically connected to one of said axles by a power-transmitting device, and a mechanical power-transmitting device connecting the two axles or wheels thereof, whereby the traction effort of the four wheels is made available.

20. The combination of a four-wheeled vehicle having two rotating axles, an electric motor having one end or part journaled on one of said axles and its other end or part supported on the other axle, and flexible or elastic gearing between the motor-shaft and the axle upon which it is journaled.

21. The combination of a four-wheeled vehicle having two rotating axles, an electric motor having one end or part journaled on one of said axles and its other end rigidly or firmly supported, and an elastic or flexible power-transmitting connection between the motor shaft and axle upon which it is journaled.

22. The combination of an electric motor having a rotating shaft and journaled upon a power-receiving shaft of an electrically-propelled vehicle, and a flexible or elastic power-transmitting connection between the motor-shaft and power-receiving shaft.

23. The combination of an electric motor having a rotating shaft and journaled upon a power-receiving shaft of an electrically-propelled vehicle, a pinion-gear on the motor-shaft, and a large gear on the power-receiving shaft, one of which gears is fast to its shaft and the other of which is connected to its shaft by an elastic connection.

24. The combination of an electric motor journaled on a power-receiving shaft and having a rotating shaft, a power-receiving shaft of an electrically-propelled vehicle, a pinion-gear on the motor-shaft, and a large gear on the power-receiving shaft, one of which gears is fast to its shaft, the other of which is connected to its shaft by an elastic connection consisting of an arm secured to the shaft and a spring arranged between the arm and gear.

25. The combination of an electric motor journaled on a power-receiving shaft and having a rotating shaft, a power-receiving shaft of an electrically-propelled vehicle, a pinion-gear on the motor-shaft, a large gear on the power-receiving shaft, one of which gears is fast to its shaft, the other of which is connected to its shaft by an elastic connection consisting of an arm secured to the shaft, a spring arranged upon each side of the arm, and connections between the said springs and the gear.

26. The combination of an electric motor having a rotating shaft, a power-receiving shaft of an electrically-propelled vehicle, a pinion-gear on the motor-shaft, a large gear on the power-receiving shaft, one of which gears is fast to its shaft, the other of which is connected to its shaft by an elastic connection consisting of an arm secured to the shaft, a spring arranged upon each side of the arm and held between cups or lugs on the gear, and a retaining-bolt passing through said cups, springs, and arm.

27. The combination of a car-body, a pivoted truck therefor, an electric motor to rotate the axle of said truck, a source of electrical energy, an electric circuit for supplying electric current from the source of energy to the electric motor, a regulator for controlling the current passing to the motor, and mechanical devices for operating the regulator controlled by the movement of the truck with respect to the car-body, whereby the current supplied to the motor may be increased when the car is on a curve.

28. In an electrically-propelled vehicle, the combination of a car-body, a pivoted truck located under the platform of the car-body and near its rear portion, an electric motor carried by said pivoted truck and adapted to rotate the axle thereof, a motor-circuit for supplying electric current to said motor, a current-regulating device for said motor-circuit, and supporting-wheels for the forward end of the vehicle independent of the electrically-driven rear truck.

29. The combination, in an electrically-propelled vehicle, of two axles and their wheels, suitable framing supporting said axles in parallel relation with respect to each other, an electric motor carried by said vehicle and mechanically connected to rotate one of the axles, and power-transmitting devices independent of the motor for transmitting rotary motion from the electrically-driven axle to the other axle.

30. In an electrically-propelled vehicle, the combination of two axles, a frame for supporting the axles in parallel relation, an electric motor journaled upon one of the axles, power-transmitting connections between said axle and armature-shaft of the motor, a support for the other end of the motor independent of the vehicle-body, and power-transmitting connections between the two axles independent of the motor, whereby both axles are simultaneously rotated.

In testimony of which invention I hereunto set my hand.

RUDOLPH M. HUNTER.

Witnesses:
RICHARD S. CHILD, Jr.,
E. M. BRECKINREED.